(12) United States Patent
Burress et al.

(10) Patent No.: US 10,935,362 B2
(45) Date of Patent: Mar. 2, 2021

(54) CALIBRATABLE DOOR STATUS INDICATION SYSTEM

(71) Applicant: Sheldon Manufacturing Inc., Cornelius, OR (US)

(72) Inventors: Edward Francis Burress, Washougal, WA (US); Stephen Lawrence Dillier, Irving, TX (US)

(*) Notice: Subject to any disclaimer, the term of this patent is extended or adjusted under 35 U.S.C. 154(b) by 0 days.

(21) Appl. No.: 16/425,802

(22) Filed: May 29, 2019

(65) Prior Publication Data

US 2020/0378740 A1   Dec. 3, 2020

(51) Int. Cl.
| | | |
|---|---|---|
| G01B 7/14 | (2006.01) |
| G08B 13/08 | (2006.01) |
| E05F 15/77 | (2015.01) |
| G08B 7/06 | (2006.01) |

(52) U.S. Cl.
CPC .............. *G01B 7/14* (2013.01); *E05F 15/77* (2015.01); *G08B 7/06* (2013.01); *G08B 13/08* (2013.01)

(58) Field of Classification Search
CPC .................................. G01B 7/14; B08B 7/06
USPC .......................................... 324/207.2, 207.22
See application file for complete search history.

(56) References Cited

U.S. PATENT DOCUMENTS

| | | | | |
|---|---|---|---|---|
| 2011/0115476 A1* | 5/2011 | Kapser | ............... | G01R 33/0029 324/207.2 |
| 2014/0062466 A1* | 3/2014 | Thibault | .................. | G01B 7/14 324/207.22 |
| 2016/0348415 A1* | 12/2016 | Baumgarte | ............. | E05F 15/77 |
| 2019/0051129 A1* | 2/2019 | Hunt | ...................... | G08B 21/22 |

* cited by examiner

*Primary Examiner* — Albert K Wong
(74) *Attorney, Agent, or Firm* — Mark S. Hubert

(57) ABSTRACT

An sensor unit has an analog Hall-effect sensor coupled to a microprocessor containing an analog to digital converter. It is mounted to the frame of a cell door. A magnet is mounted to the cell door so that when the door is closed, they are in close-proximity. A calibration initiates the storage of digital voltage signal presented by the Hall-effect sensor, via an analog to digital converter, when the cell door is closed. This door-closed value is constantly compared to the current value based on the position of the cell door. If this value deviates within preset limitations of the stored value, the sensor unit signals a fault condition to a connected central control panel which sends a "door ajar" notification to a designated user's cell phone as well as activating a local alarm.

5 Claims, 3 Drawing Sheets

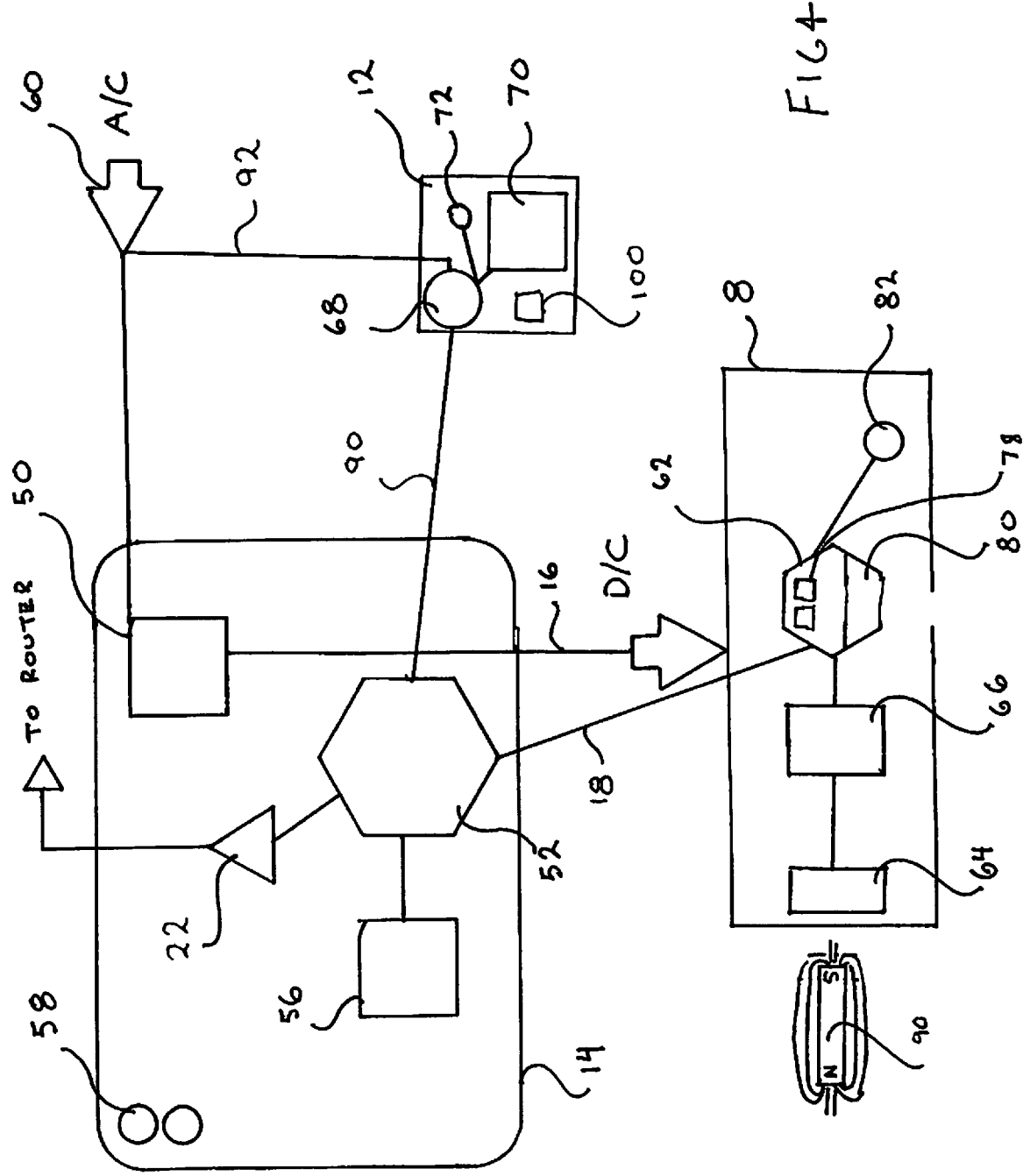

CALIBRATABLE DOOR STATUS INDICATION SYSTEM

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to door status indicators, and more particularly to smart proximity sensor technology.

BACKGROUND

Door status indicating or alarm systems also known as door switches are commonly used in multiple fields not just the home and commercial security industries. Magnetic switches are commonly used because of their low cost and relatively low failure rates. Magnets are generally placed on the moveable member (door or window) and a magnetically activated or magnetically actuated mechanical switch is mounted in close proximity to where the magnet resides when the moveable member is in its closed position. These are known as proximity sensors. Common types of these proximity sensors are reed switches or Hall Effect sensors. When the magnet is in close proximity to its associated switch (as in the case where the moveable member is closed) the switches close or open a set of electrical contacts that provide or disrupt electrical continuity to a notification circuit. When the magnet is moved away from its associated switch (as in the case where the moveable member is opened) the switches reverse their condition and open or close this set of electrical contacts that provide or disrupt electrical continuity to an alarm circuit. This opening results in a notification that the moveable member has been opened.

The problem herein lies in the with the physics of the magnetic switch. It is basically an all or nothing system. The notification occurs when the magnetic switch changes its state and deenergizes or energizes the electrical notification circuit. This occurs when the magnet has been moved a "critical" distance from the switch or when the magnetic field from the magnet is no longer strong enough to actuate or activate the magnetic switch. Thus, mechanical adjustment is critical. While magnetic fields diminish quickly with distance there is still a short distance beyond closed where the magnetic field is strong enough to retain the magnetic switch in the same condition as if the moveable member were closed. With conventional security switches this short distance is generally less than an inch. While this is completely acceptable in the security industry as entry cannot be gained from a one-inch open door or window, this is not acceptable in other fields.

Many research, scientific and medical facilities use hoods, chambers or enclosures where the atmosphere, contents or temperature is tightly controlled. Accidental partial openings are a reality wherein an access opening via a moveable member may remain open a fraction of an inch. This minute opening, if left unnoticed over a period of time, may ruin experimental results, waste costly cover gasses, endanger personnel or have other costly repercussions. A household refrigerator is a perfect example where such a system is warranted.

Additionally, security systems utilizing these magnetic actuated mechanical switches may be simply defeated by utilizing a second (usually stronger) magnet, placed in close enough proximity to the magnetic switch to maintain its current positional status, while the moveable member (door or window) is opened.

Henceforth, a more sensitive notification system of the status of an access point opening would fulfill a long felt need in any industry that utilizes controlled environment enclosures. Such a notification system would also enhance the reliability of building security systems that utilize magnetic switches on their doors and windows. This new invention utilizes and combines known and new technologies in a unique and novel configuration to overcome the aforementioned problems and accomplish this.

BRIEF SUMMARY

In accordance with various embodiments, a calibrated magnetic door (access point) status indication system is provided that will provide an electronic signal for notification or alarm purposes when the door is not fully secured.

A door status indicating system capable of indicating when minute variations exist in the door position other than its fully closed position.

A door status indicating system capable of indicating when the presence of another magnetic field is brought in proximity of its sensor.

A door position alarm system capable of alerting designated personal when the door is ajar even the miniscule amount.

Various modifications and additions can be made to the embodiments discussed without departing from the scope of the invention. For example, while the embodiments described herein refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 4 is a schematic representation of the magnetic calibratable door status indication system showing its constituent components.

DETAILED DESCRIPTION OF CERTAIN EMBODIMENTS

Figure 1:
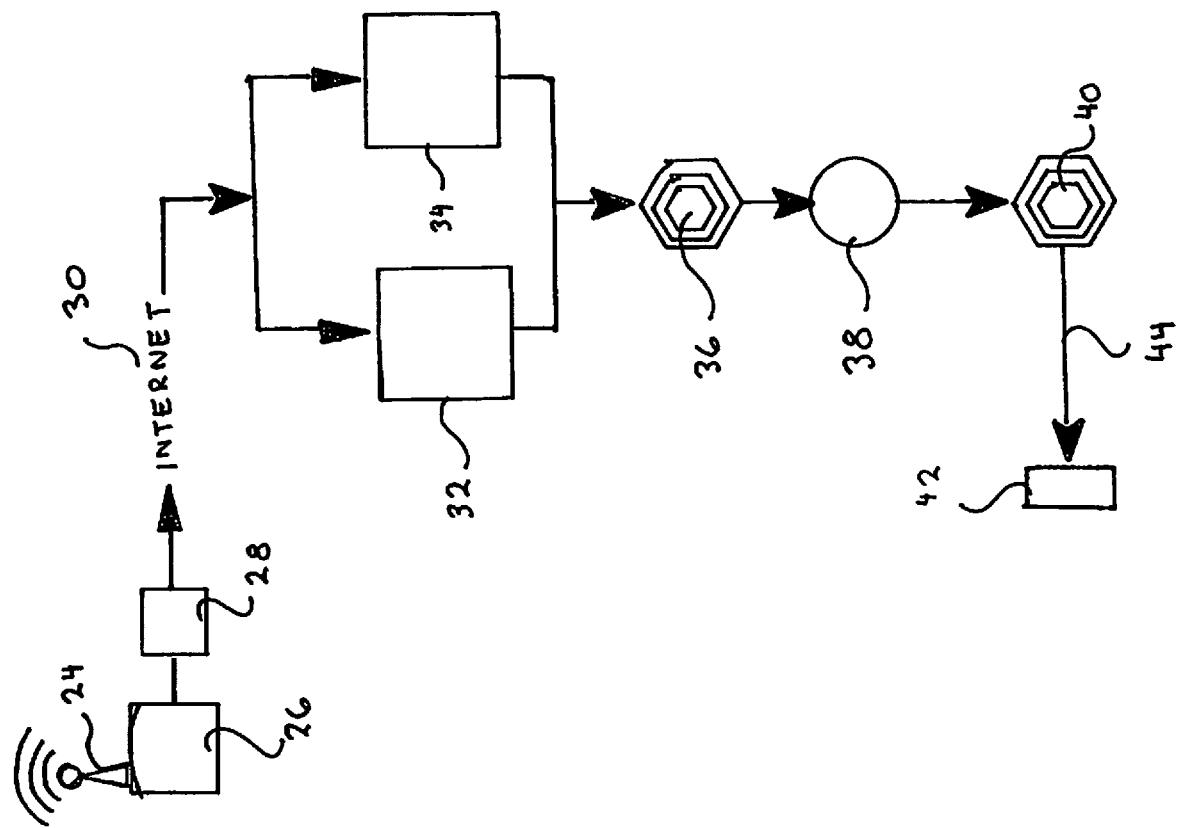
FIG. 1 is a schematic representation of the magnetic, calibratable door status indication system with its alarm transmission pathway.
Figure 1:
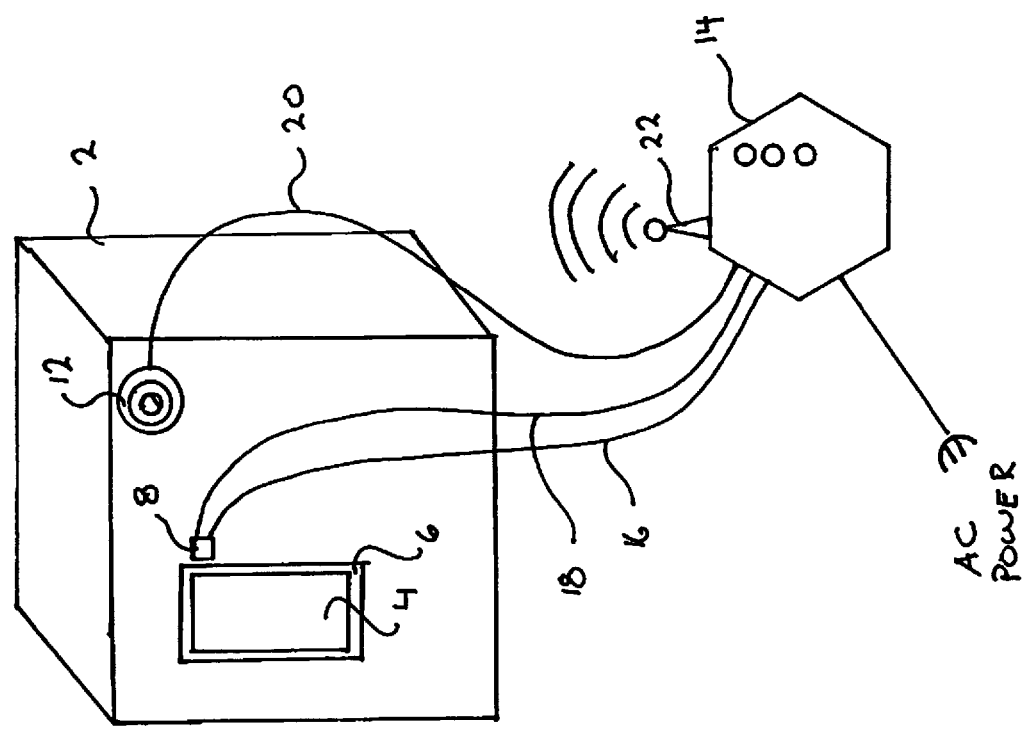
Figure 2:
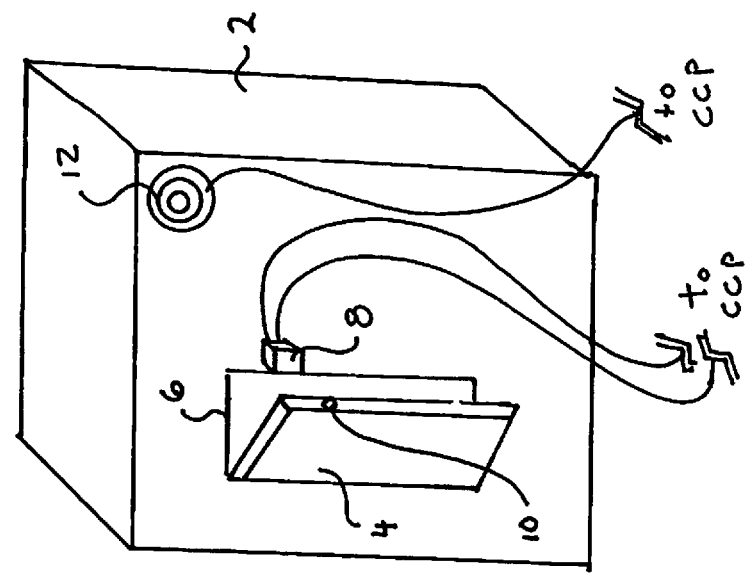
FIG. 2 is a schematic representation of the magnetic calibratable door status indication system as installed on a cell with a closed door.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be appreciated that the features described with respect to one embodiment may be incorporated with other embodiments as well. By the same token, however, no single feature or features of any described embodiment should be considered essential to every embodiment of the invention, as other embodiments of the invention may omit such feature.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein the term "Hall effect sensor" refers to a device (generally, a thin strip of metal (the Hall plate) having high electron mobility (such as gallium arsenide) with a current applied along it) that is used to measure the magnitude of a magnetic field, whether it is changing or static. Its output voltage is directly proportional to the magnetic field strength through it. When combined with threshold detection it acts as a switch. With a known magnetic field, the distance of the magnet from the Hall plate can be determined.

The present invention relates to a novel design for an access point status indicating system that overcomes the prior art limitations for proximity sensing and defeats unwanted entry attempts of such magnetic switch security systems.

There is a plethora of self-contained switches which work on an analog value of magnetic force and which offer some adjustment to sense the level of magnetic force they are exposed to. These mechanically adjustable type sensors offer an advantage in that they can set to detect a specific range of magnetic field and trigger an alarm or action if the close magnetic field changes. They allow the user to insert a tool such as a small screwdriver and set the threshold values for open and close. Other types require a mechanical adjustment to bring the magnet or the sensor to an acceptable distance between to detect a door closed condition. While these types are adjustable, they are not suited for all applications because they are relatively large and difficult to adjust if installed so as to be hidden. If used in hoods or cabinets, adjustments may be located where there are high voltages, or limited access.

Analog capacitive sensors offer similar adjustments using a tool to set the threshold for a door closed condition. While they do not require a magnet to operate, they do require that the object being sensed such as a door is made of metal or contains a metal disk in close proximity to the sensor. They are also relatively large for incorporation into a piece of laboratory equipment. While they offer a threshold of open and closed, they are adjusted manually, must be in an area which has easy access and visibility to the user.

Capacitive sensors offer no remote adjustability, nor any information about the speed of the door being opened, or the amount of opening.

Similarly, self-contained Hall-effect sensors are available which require the use of a magnet with a specific pole of the magnet facing the sensor. They are locally adjustable to set the trip point so that they may be set to a door closed condition and the threshold adjusted manually. Accordingly, they require being mounted in an area where the adjustment may be accessed by the user. Again, this will serve to determine a single level of open/close condition manually set by the user. The disadvantages to this approach are that it requires a magnet with a specific pole facing the sensor, manual adjustment of a potentiometer on the sensor, and provides no other information other than open or close.

The novelty of the present invention will be seen it its ability to overcome all of the prior art limitations, therein presenting a solution to doors that are ajar on a cell an imperceivably visual amount yet enough to destroy the cell environment. The present invention will be described as utilized in its primary capacity, as an indicator of the door status on a research/production cell or glovebox, however it may be incorporated on any door assembly whether on a cell enclosure or otherwise.

Figure 3:
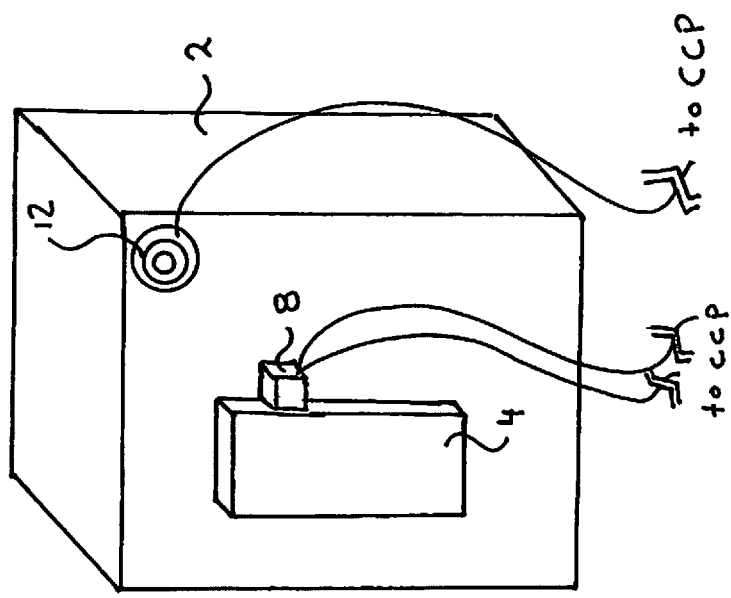
FIG. 3 is a schematic representation of the magnetic calibratable door status indication system as installed on a cell with an open door.

Looking at FIG. 1, the inventive concept can best be explained in broad terms. The cell 2 has a door 4 that fits air tightly into a door jamb 6. A door status indication sensor module (a sensor) 8 is mounted adjacent an edge of the closed door, generally on either the door jamb or the exterior face of the cell 2 (or structure housing the door) where a sensor magnet 10 is affixed. (FIG. 3) (Note that this placement strategy is the one commonly used although in alternate embodiments it is envisioned that the sensor 8 may be placed on the door with the magnet affixed adjacent the edge of the door when closed.) This sensor 8 has a proximity sensor therein, which in the preferred and discussed embodiment is a Hall effect sensor. When the door 4 is closed, the magnet 10 is in operable proximity to the Hall plate of the Hall effect sensor on the door status indication sensor module 8. (FIG. 3) Operable proximity is determined as the physical distance that still allows for a change in the DC output voltage from the Hall effect sensor when the magnet 10 and sensor 8 are separated any distance from each other. Preferably the sensor magnet 10 will be installed in or on the edge of the door so as to be protected from inadvertent movement when the door is closed. (FIG. 4) There is a local optional audible/visual alarm 12 mounted on or near the cell 2.

An AC powered central control panel (CCP) 14 is remotely located and is connected to the sensor 8 by a power cable bundle 16 and a data communication cable 18. The CCP is remotely located and has its own integrated alarm notification device as well as being connected to an optional local alarm 12 with an alarm initiation signal and/or power cable 20. (It is known in alternate embodiments the CCP may also be powered by an uninterruptable power supply or a DC battery/inverter combination as is well known in the art.)

The CCP 14 has a wireless communication transceiver 22 and is in communication with the router wireless transceiver 24 of router 26 which is operatively connected to internet coupled modem 28 such that it may broadcast data packages wirelessly to the internet 30. These data packages send cell door status indication alarms to the cell phone/s of personal designated in the instructions of the application running on the computer in the CCP.

Simply stated, in operation, when the cell door 4 is positioned in any location other than the fully closed position the sensor 8 will detect this change and signal the CCP which will contact a cell phone and send a message identifying the cell and its door ajar status.

Looking at FIG. 4 the constituent components and functionality of the system can best be discussed. The CCP 14 is an enclosure with a power management module 50, a computer 52, a wireless transceiver 22, a tactile input device 56 and an alarm indicator 58. The power management module 50 is connected to an A/C power source 60 and it has an inverter transformer that converts the A/C power to D/C power at a voltage level appropriate for the operation of the microprocessor 62, the computer 52, the tactile input device 56 and wireless transceiver 22 as well as the Hall effect sensor and the analog to digital converter 66 of the sensor module 8. The computer 52 is a multi function computer or microcomputer capable of receiving input data from its tactile input device 56 as well as two-way data communication with the microprocessor 62. The computer 52 is operatively connected to a wireless transceiver 22 for data transfer to the internet via the local router 26 and modem 28 for sending cell phone alert messages as discussed herein.

The computer has an application operatively loaded into memory that has a relational database that may be populated with data input from the tactile input device that includes sensor identifications, smart cell phone numbers of designated contact personal; the internet address of their cell carriers, and the internet address of a free SMS Gateway provider's website. This application has an application with a set of instructions that poll the processors of all connected sensors 8 seeking confirmation of the sensor's operability and its associated door status. Upon receipt of a data signal from a sensor 8 showing a door ajar signal (when the door is other than completely closed), the computer queries the relational database, obtains the designated contact information for that cell (electronic pathways/routing and the contactee) and sends out an alert message to the designated contactee's cell phone in the manner disclosed herein.

Upon receipt of a data signal from the door status indication sensor module 8 showing a door ajar signal the computer 52 also illuminates an alarm indicator 58 (preferably an LED) thereon (or nearby) the CCP 14 and optionally sends a signal to the relay switch module 68 of the local audio/visual alarm 12 to provide D/C power to the piezoelectric horn 70 and optional lights 72.

The door status indication sensor module 8 is located in operational proximity to a magnet 90. The sensor module 8 has a Hall effect sensor 64 that receives a D/C voltage input from the CCP 14 and provides an analog DC voltage output signal to the analog to digital convertor 66 based on the magnetic field strength the Hall effect sensor 64 sees based on its proximity to the magnet 90. The analog to digital converter 66 converts this analog DC output voltage signal to a digital value and sends this digital value to the microprocessor 62. The microprocessor 62 has a calibration circuit 78 that when initiated by the calibrate button 82, stores this digital DC voltage output signal value from the Hall effect sensor in digital format in the microprocessor memory 80.

The CCP is operatively connected so as to provide DC power from the power management module 50 to the sensor 8 through its power cable bundle 16 where the power is distributed to the to the Hall effect sensor 64, the analog to digital converter 66 and the microprocessor 62. The computer 52 is operatively connected to the microprocessor 62 via a data communication cable 18.

In operation, the CCP is powered and connected wirelessly (or via hard wires) to a local router/modem combination 26/28 with access to the internet. 30 The CCP is also hardwire connected to the sensor 8 with power and control cables 16/18 and also hardwire connected to the local alarm 12 at the cell with an alarm signal cable 90 and or an optional power cable 92 (preferably a D/C voltage between 5 and 30 volts) as the local alarm 12 preferably has its own DC battery 100. The door to the cell is fully closed and the calibrate command to the microprocessor on the sensor 8 is initiated via a local calibrate push button 82 on the sensor 8 or by an initiation signal sent from the computer 52 in the CCP 14. (This signal at the CCP may be sent from a tactile interface 56 such as a keyboard or a touch screen connected to the computer.) The Hall effect sensor 64 in proximity to the door magnet 90 in the door closed position, produces an output DC voltage. This output DC voltage passes through the analog to digital converter where it is converted into a digital signal that is routed to the microprocessor 62 in the sensor 8. The calibrate instructions programed in the microprocessor 62 upon receiving this calibrate signal, stores this digital signal in its memory as the door closed digital DC voltage value (the baseline value). The calibrate command is completed and terminated once this closed door DC voltage value is stored.

The CCP's computer has an algorithmic application that constantly polls each of the connected sensors in turn and asks them to perform a self diagnosis and to report. When the microprocessor of the sensor receives this signal, it performs a self diagnostic and a comparison of the magnitude of the current digital signal from the Hall Effect sensor (converted to a digital signal as described above and relayed through the microprocessor) to the door closed digital DC voltage value, stored in its memory. The microprocessor 62 then sends an a data signal back to the CCP 14 with its specific identification, whether it is functioning properly, and whether it has detected a deviation between the Hall Effect sensor output voltage values converted to a digital value by the analog to digital convertor, and the door closed digital DC voltage value stored in its memory. If this deviation exceeds a preset value (generally a percentage as set in the microprocessor's compare algorithm), then an alert data signal is sent to the CCP 14 relaying the specific identification of the sensing unit and that a deviance beyond the allowable door closed value has been noted (a door open signal).

The CCP, upon receipt of this alert data signal, either continues to poll the other sensors or it goes into alarm mode. In the alarm mode it actuates an alarm indicator 58 on the CCP unit itself (preferably an LED); checks its relational data base for that sensor's specific identification; determines the smart phone number of the contactee as well as the internet address of their cell carriers, and the internet address of a free SMS Gateway website. (This allows the alarm text to be redundantly routed to the user's smart phone two different ways.) It also references the local alarm connection for that cell 2 associated with the sensor 8. The CCP 14 then sends at least one (preferably two) wireless data output signals through the local internet connected router/modem 26/28 that it is connected to. This signal is subsequently sent via the internet 30 to the associated user's cell phone 42 (from the wireless cell carrier's website 32 or from a SMS gateway website 34) informing that the specific cell's door on is ajar. The CCP 14 also sends an alarm signal to the local audible/visual alarm 12 on that cell 2 to initiate an audible and visual alarm.

Aside from the polling feature driven by the instruction set in the computer in the CCP, the microprocessor 62 also has a compare algorithm that constantly compares the magnitude of the current output DC voltage signal from the Hall Effect sensor (after the analog to digital converter) to the door closed digital DC voltage value stored in its memory. If it deviates more than a preset value (as set in the microprocessor's compare algorithm) then an alert data signal is sent to the CCP relaying the specific identification of the sensing unit and that a deviance beyond the allowable door closed value has been noted, invoking the unprompted alarm mode in the CCP 14 which proceeds as outlined above.

The power from the battery 100 in the local arm 12 is provided at the appropriate voltage and current required by the wireless beacon 14 and the alarm horn 16 by any of a host of well-known devices in the field including a simple resistor.

An install application on the computer of the CCP is loaded and accessed, and through a series of on screen instructions, prompts the input or several parameters into a relational database: the identification number of the sensor; the location of the cell that sensor is affixed to; the cell phone numbers of the personal designated for notification of that cell's door status; the internet address of their specific carriers; and the internet address of a free SMS Gateway provider's website. In the instruction set on the computer activated by a specific sensor alarm is an algorithm that combines the correct designated personal's contact information with the internet address of their specific cell phone carriers and also with the internet address of a free SMS Gateway provider's website. This allows the alarm text to be routed to the user's smart phone two different ways.

Looking at FIG. 1, the CCP computer generates an alert signal comprised of the cell identification and door status and sends it via the local router and the internet as a http protocol web message to either the wireless carrier's web site 32 or to an SMS gateway website 34. From here the signal is converted into the appropriate short message service (SMS) transmission protocol and sent wirelessly as an RF signal to the local cell tower 36 which routes it to the SMSC (Short Message Service Center) 38 which sends it to the closest cell tower 40 that routes it to the end user's cell phone 42 as a RF signal 44 where it is received as a text alert.

In an alternate embodiment, the CCP computer may generate an data package of an email using the user's phone numbers followed by a string of characters specific for each cell phone carrier (i.e. for AT & T it would be the phone number@text.att.net) which is sent via the local router 26 and modem 28 and internet 30 and routed as a text message to the users wireless carrier's web site 32 where it is converted to an SMS protocol message and sent as a RF signal 44 to the users cell phone 42 as outlined above.

One of the benefits of the text messaging alert is that the message will always reach the appropriate cell phone. SMS messages are delivered even if the cell phone is turned off, unpowered or out of range. It is a store-and-message service. Once regular service is once again supplied to the cell phone, any waiting messages will come through. That is why the system has redundancy in that there are two identical but separate text messages sent. Additionally, the local computer may send the text message to a group of cell phones such as the husband, the wife, the kids, the maid etc. (broadcasting).

While certain features and aspects have been described with respect to exemplary embodiments, one skilled in the art will recognize that numerous modifications are possible. Consequently, although several exemplary embodiments are described above, it will be appreciated that the invention is intended to cover all modifications and equivalents within the scope of the following claims. In the way of example, it is known that an alternative embodiment CCP may send an audible message to the designated cell phone as a voice alert rather than, or in conjunction with, the text alert described herein. Here, the application would allow for and store voice recordings for the various cell locations in a relational database that would be accessed upon the receipt of a door ajar signal from the sensor and routed to the cell phone as discussed herein.

The sensors, CCP and router can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention may include a non-transitory machine-readable medium comprising instructions executable by one or more processors, the instructions comprising instructions to perform the elements of the embodiments as described herein.

While certain features and aspects have been described with respect to exemplary embodiments, one skilled in the art will recognize that numerous modifications are possible.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

Having thus described the invention, what is claimed as new and desired to be secured by Letters Patent is as follows:

1. A calibratable, door status indication system, comprising:
   a door status indication sensor module mountable to a structure housing a door and having a Hall Effect proximity sensor, a microprocessor with a memory, an analog to digital converter connected between said Hall effect proximity sensor and said microprocessor, and a calibrate push button;
   a magnet, adjustably affixable to said door adjacent to and within operable proximity of said Hall Effect proximity sensor when said door is closed;
   a local alarm;
   a powered central control panel is housed in an enclosure containing a computer in communication with said microprocessor a tactile input device connected to said computer for data input, an alarm indicator connected to said computer, and a power management system connected to an AC power source and to said microprocessor, said Hall effect sensor, said analog to digital converter, said computer, said alarm indicator and said tactile input device, providing power thereto, said control panel operationally connected to said local alarm and said door status indication sensor module by a power cable and a data communication cable, and wherein central control panel is connectable to an internet through a local modem and a router;
   wherein said microprocessor constantly polls a DC output voltage from said Hall effect proximity sensor that is proportional to a separation distance between said Hall Effect proximity sensor and said magnet, and has been transmitted to said analog to digital convertor and converted to a digital value; and
   wherein said calibrate push button initiates a set of calibrate instructions in said microprocessor, that polls a DC output voltage from said Hall Effect proximity sensor that is proportional to the distance between said Hall Effect proximity sensor and said magnet when said door is closed, that is transmitted to said microprocessor and stored in said memory as a baseline digital value;
   and wherein said door status indication sensor module microprocessor constantly compares said digital value to said baseline digital value and sends an alert signal to said central control panel when there is a deviation therebetween;
   wherein said central control panel initiates at least one alarm in response to receiving said alert signal;
   an application loaded onto said computer, said application having a relational database populated with data input from said tactile input device that includes a door status indication sensor identification, a smart cell phone number, an internet address of a cell carrier for said smart cell phone, and an internet address of a free SMS Gateway provider's website;
   wherein said computer transmits said door status indication sensor identification as text messages to said smart phone via said internet from said smart cell phone number and said internet address of said free SMS Gateway provider's website in said relational database.

2. The calibratable door status indication system of claim 1 wherein said local alarm is comprised of:
   a relay switch module connectable to a power source;
   a horn; and
   a light;
   wherein said central control panel is connected to said relay switch module, and upon receipt of an input voltage signal from said central control panel, said relay switch module provides power to said horn and said light.

3. The calibratable door status indication system of claim 2, said central control panel having a wireless transceiver connected to said computer and powered by said power module, wherein said computer is connectable with said router for data transmission of said door status indication sensor identification by wireless communication.

4. The calibratable door status indication system of claim 2 wherein said computer is in two-way communication with said microprocessor.

5. The calibratable door status indication system of claim 1 wherein said application has a set of instructions upon receipt of an alert signal from said microprocessor, queries said relational database, obtains the designated contact information for that cell and sends out said door status indication sensor identification to said smart phone.

* * * * *